United States Patent [19]
Strøm

[11] Patent Number: 6,102,594
[45] Date of Patent: Aug. 15, 2000

[54] KEYBOARD FOR TOUCH TYPING USING ONLY ONE HAND

[75] Inventor: Georg Strøm, Lejre, Denmark

[73] Assignee: Telefonaktiebolaget LM Ericsson, Stockholm, Sweden

[21] Appl. No.: 09/307,557

[22] Filed: May 10, 1999

[30] Foreign Application Priority Data

May 11, 1998 [EP] European Pat. Off. ............... 98108513

[51] Int. Cl.[7] ....................................................... B41J 5/08
[52] U.S. Cl. ........................... 400/486; 400/489; 400/480; 400/485; 341/21; 341/22
[58] Field of Search ..................................... 400/486, 485, 400/489, 480, 481; 341/21, 22

[56] References Cited

U.S. PATENT DOCUMENTS

| 5,288,158 | 2/1994 | Matias | 40/472 |
| 5,336,002 | 8/1994 | Russo | 400/489 |
| 5,675,329 | 10/1997 | Barker et al. | 341/22 |

FOREIGN PATENT DOCUMENTS

| 2 112 787 | 1/1984 | United Kingdom . | |
| WO 91/03782 | 3/1991 | WIPO . | |
| 96/02394 | 2/1996 | WIPO . | |

OTHER PUBLICATIONS

Patent Abstract of Japan, vol. 010, No. 330, Nov. 11, 1986.

European Search Report, EP 98 10 8513.

*Primary Examiner*—John S. Hilten
*Assistant Examiner*—Minh Chau
*Attorney, Agent, or Firm*—Burns, Doane, Swecker & Mathis, L.L.P.

[57] ABSTRACT

Keyboard for one-handed touch typing derived from a normal Sholes keyboard, where each character-key is assigned two characters (for instance T/Y), thereby reducing the number of keys to approximately half the number of keys on a normal Sholes keyboard. The choice between the two alternative characters of a specific key is based on the mode of depression of that particular key, and hence no separate key for choise between the two alternatives is needed. The characteristics of the keyboard can either be set once and for all or can be particularly adapted to the specific user of the keyboard, such as for instance to the user's writing speed.

11 Claims, 3 Drawing Sheets

FIG. 2

| DEL | $ | 1-' | 2-+ | 3-0 | 4-9 | 5-8 | 6-7 |
|-----|---|-----|-----|-----|-----|-----|-----|
| TAB | ] | [ | Q-P | W-O | E-I | R-U | T-Y |
| ↵ | \ | ' | A-: | S-L | D-K | F-J | G-H |
| | | <- | Z-/ | X- | C- | V-M | B-N |
| | | | | | | SPACE | |

KEYBOARD FOR TOUCH TYPING USING ONLY ONE HAND

TECHNICAL FIELD OF THE INVENTION

The present invention relates to alphanumeric keyboards for use in portable computers, control units etc., and more particularly to alphanumeric keyboards for touch typing using only one hand.

DESCRIPTION OF RELATED ART

There have been numerous attempts of devising means of entering alphanumeric characters not requiring two hands for fast and reliable operation. None of these, however, have been entirely successful.

PCT/CA90/00274 discloses a keyboard for one-handed operation referred to as the "Mathias keyboard" named after its first inventor. This keyboard comprises a keyboard derived from the Sholes keyboard and on principle corresponding to the keyboard of the present invention shown in FIG. 2. In the Mathias keyboard two characters are assigned to each key and a so-called "modifier key" is used to distinguish between the two characters of a given key. If the modifier key is depressed prior to or during the depression of a specific character key, one of the alternative characters are written, and if the modifier key is not depressed the other alternative character is written.

It is possible for a person who is accustomed to the Sholes keyboard to learn relatively quickly to do touch typing on the Mathias keyboard, but the necessary application of the modifier key constitutes an unnatural element in the writing process and is felt cumbersome by some users.

A different approach is utilized in so-called chorded keyboards in which simultaneous depression of a specific combination of keys corresponds to a specific alphanumeric character. The technique utilized in the chorded keyboard thus constitutes a major departure from the normal writing process utilized in the Sholes keyboard and hence requires a considerable learning period, a fact which makes the chorded keyboard less acceptable from the users' point of view.

UK patent application 2 122 787 A discloses a single handed keyboard which can either be adapted to right- or left-hand use. The keyboard according to this invention comprises a full character keyboard, although the characters' position on the keyboard differs from the positions on the normal Sholes keyboard. The keyboard comprises two modes of operation: a first mode in which the characters are written as indicated on the keyboard and a second mode, in which the character mirrored in a plane subdividing the keyboard into two equal parts is being written. Hardware or software means are comprised in order to shift between these two modes of operation with the aim of providing either a right-hand version or a left-hand version of the keyboard.

SUMMARY OF THE INVENTION

All of the above mentioned systems suffer from considerable drawbacks both regarding the mechanical writing process (application of a modifier key or various combinations of depressed keys) and regarding the size of the keys in the case of a keyboard with one key for each character. These drawbacks may result in less acceptance of the keyboard due to an "unnatural" writing process and an inevitable learning period (in case of the Mathias keyboard and the chorded keyboard) and in reduced writing speed and/or increased number of errors. It is thus desirable to devise a keyboard for one-handed touch typing which is reliable, readily usable for someone accustomed to the normal Sholes keyboard and which enables writing speeds and error rates comparable with the Sholes keyboard.

This problem is solved according to the invention with a keyboard which basically derives from the normal Sholes keyboard by assigning two characters to each key, so that one of the characters is the character normally associated with that key and the alternative character is the "mirror" character obtained by mirroring the characters of the right half area of the Sholes keyboard about a plane subdividing the Sholes keyboard into two areas of equal size. Thus, for instance, as the first non-numeric character lines in the Sholes keyboard contains the following series of ten characters: q, w, e, r, t, y, u, i, o, p, the corresponding line in the keyboard according to the invention will encompass the following series of keys, each of which is assigned a double function: q/p, w/o, e/i, r/u and t/y. Extending this method to all relevant keys of the Sholes keyboard it is possible to derive the complete keyboard according to the invention.

The choice between the two alternative characters of each key of the keyboard is according to the invention made without use of a separate key, such as the above mentioned modifier key, according to the manner in which a specific key is depressed. Two different means of selection of a specific character may be used;

1) The choice of character depends on the time of depression of a specific key, i.e. if a specific key is depressed less than a certain period of time, one character is typed, and if the key is depressed longer than a certain period of time, the alternative character is typed.

2) The choice of character depends on the force with which the key is depressed i.e. if the key is depressed, with a force below a certain level, one character is typed, and if the key is depressed with a force above a certain level, the alternative character is typed.

It is thus the object of the present invention to provide a touch typing keyboard for one-handed operation where two characters are assigned to each character key and where the choice between these two characters can be made without the necessity of using a specific key, such as the above mentioned modifier key. The keyboard shall be reliable and immediately possible to use for someone already familiar with the Sholes keyboard. Furthermore, the keyboard shall make it possible to enter text at a speed comparable with speaking and with the users thoughts (typically more than 100 characters per minute). The use shall be possible as an automatic process, i.e. it shall be possible for the user to concentrate on the text he is writing instead of having to think about how he is entering the text.

These objectives are achieved by means of a keyboard as described above. Specifically it should be made possible to adjust the distinction between a "short" and "long" depression—and/or between a "weak" and "powerful" depression appropriately, either once and for all, for a specific user, or adaptively so that the distinction between "short", "long", "weak" and "powerful" depressions depends on the previous use of the keyboard and hence on the specific user of the keyboard. Furthermore each of the keys may be assigned a different weight factor making it possible for the device to interpret the above mentioned depression characteristics differently for each key.

The keyboard according to the invention provides an advantageous solution to the problem of making a keyboard for one-handed operation which is easy to learn to utilise for a person already skilled in the use of the normal Sholes keyboard and at the same time avoiding the use of a separate key in order to shift between the alternative characters assigned to each specific key.

BRIEF DESCRIPTION OF THE DRAWINGS

FIG. 2 shows the keyboard according to the invention.

DETAILED DESCRIPTION OF THE EMBODIMENTS

One specific embodiment of a keyboard for one-handed operation according to the invention is shown in the accompanying FIGS. 1 through 4, but it is understood that modifications and variations are possible for a person skilled in the art without departing from the general idea of the invention.

Figure 1:
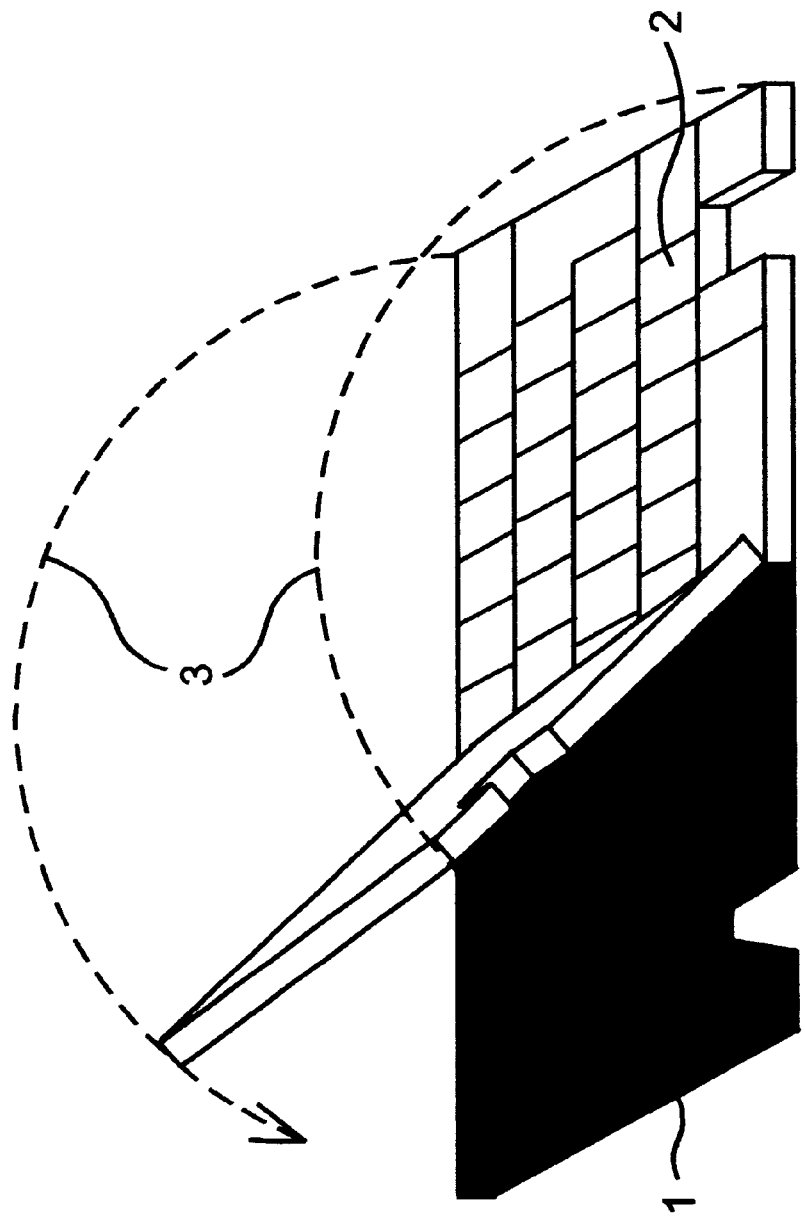
FIG. 1 shows the principle of designing the condensed keyboard according to the invention.

FIG. 1 shows the principal layout of the keyboard according to the invention. The layout is based on a normal Sholes keyboard 1 comprising a number of character keys 2. As shown, the keyboard 4 according to the invention is derived from the Sholes keyboard 1 by mirroring the right half of the keyboard 1 unto the left part of it. This layout of the keyboard corresponds to a left-handed version. It has been shown that 57% of the typing normally consist of characters from the left side of the Sholes keyboard. The new keyboard is therefore made in a left-handed version, so that the user during 57% of the time can type a character in precisely the same manner as on a Sholes keyboard. Thus, each of the keys of the Sholes keyboard which normally represents only one character (in a lover and upper case version) is assigned two different characters 5, as shown in FIG. 2, and more specifically the characters: 1-', 2-+, 3-0, 4-9, 5-8, 6-7, Q-P, W-O, E-I, R-U, T-Y, A-;, S-L, D-K, F-J, G-H, Z-/, X-., C-,, V-M, B-N. Apart from these double-character keys, a limited number of single character keys are also necessary: $, ], [, \, and <-. Also a Del (delete) key, a Tab (tabulator) key, a Return key and a space key are required.

As previously described the shift between the two alternative characters of a specific key should be indicated by using the character key itself and not a separate modifier key as for instance in the Mathias keyboard. In a preferred embodiment, which will be described thoroughly in the following, the choice between the two alternative characters of a specific key is based on the duration of the depression of the key.

A "short" duration (where the precise meaning of this term can be defined and individually adjusted, for example corresponding to the writing speed of a specific user) of the depression thus corresponds to the transmission of one character (for instance "S"), and a depression of "long" duration of the same key (this term also being adjustable in a specific case) corresponds to the alternative character (in this case "L" according to FIG. 2). A "long" duration depression is thus chosen to correspond to the transmission of a character belonging to the right portion of the Sholes keyboard.

Figure 3:
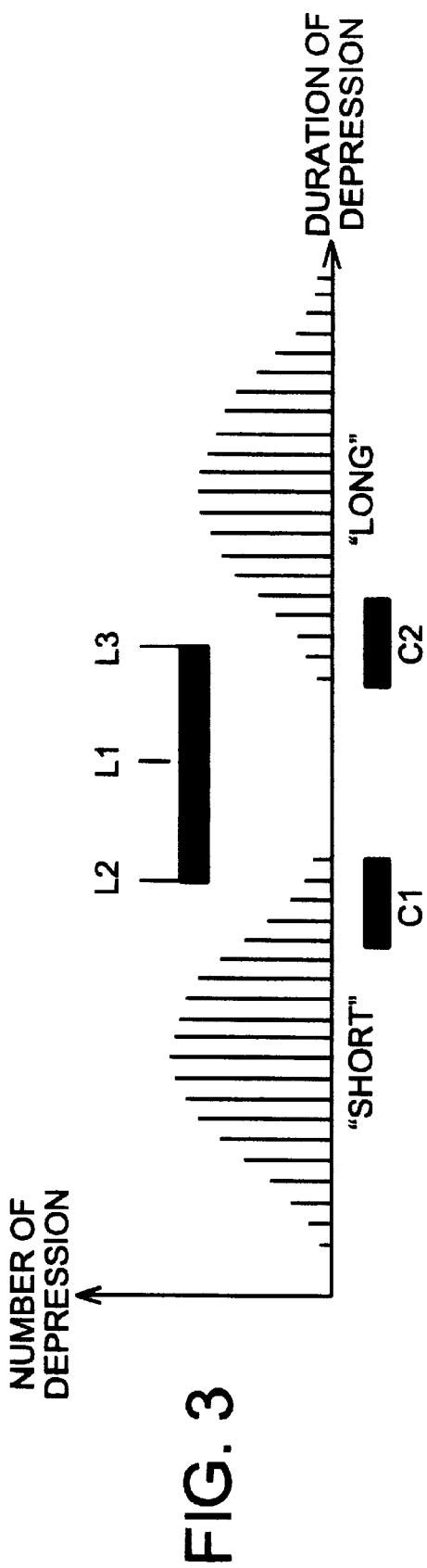
FIG. 3 shows the distributions of "short" and "long" duration depressions of a key, values L1, L2 and L3 of three determining parameters and two parameter ranges C1 and C2 according to the invention.
Figure 4:
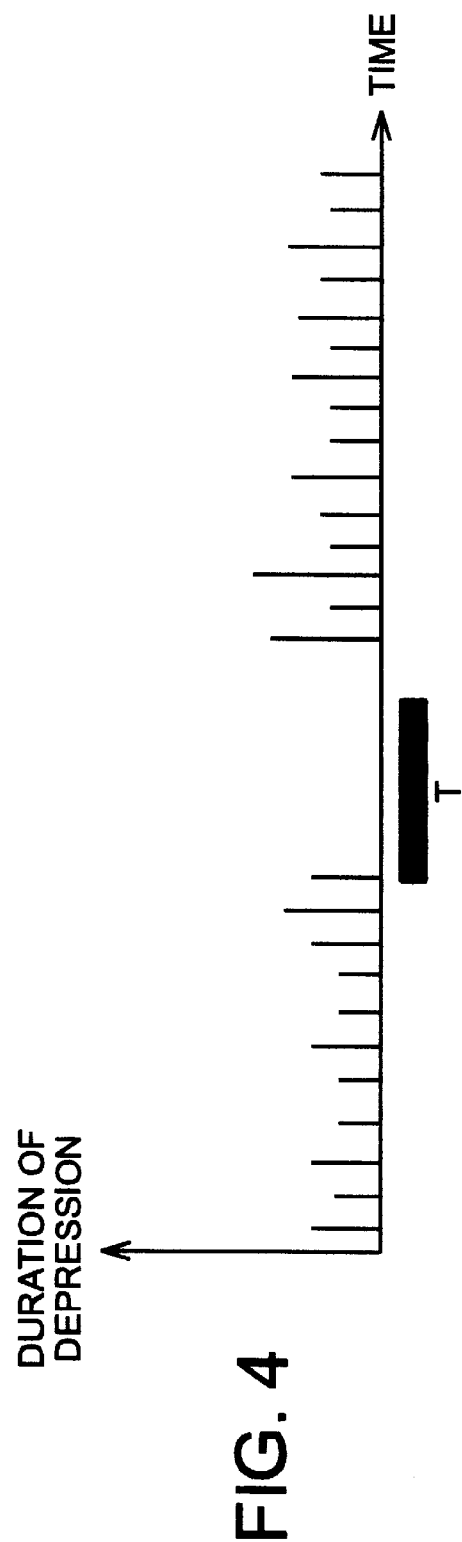
FIG. 4 shows depressions of a given key as a function of time encompassing an interruption interval T.

Different operators will type at different average speeds and make different distinctions between "short" and "long" duration depressions. FIG. 3 shows schematically two possible probability density functions corresponding to a "short" duration depression and a "long" duration depression. These density functions could for instance belong to one specific user of the keyboard or they could represent all potential users.

The distinction between short and long duration depressions can be accomplished by various means. In a first embodiment of the invention the distinction is based on a single threshold value L1 (see FIG. 3) so that a duration less than L1 will be decoded by the system as a short duration and a duration in excess of L1 will be decoded as a long duration. The threshold L1 can be chosen once and for all, but it should preferably be adjusted according to the individual writing speed and distinction between short and long duration depressions.

A second and more preferable embodiment of the invention operates with two different threshold values L2 and L3 as shown in FIG. 3. In this embodiment, one of the two alternative characters is chosen, if the duration of the depression is below the lowest threshold value L2, the other of the two alternative characters is chosen, if the duration of the depression exceeds the highest threshold value L3, and if the duration of the depression lies between L2 and L3 the choice between the two alternative characters of a given key depends on the probability of which of the two characters of that specific key is the correct one, given the specific values (i.e. specific alphanumeric characters) obtained during a number N1 of preceding depressions of that particular key. If for example the characters T-E-L-E have been typed, and if the parameter values are L2=0.1 seconds and L3=0.4 seconds, the depression of the double character key Q-P (see FIG. 2) for 0.2 seconds will lead to the writing of the letter P, because it is extremely unlikely that the letter Q will follow the combination of characters the T-E-L-E.

The threshold values L1, L2 and L3 can according to one embodiment of the invention be manually adjusted by the user of the keyboard, either one at a time or simultaneously through some pre-defined relationship between them and a parameter which can be adjusted manually by the user. The correct threshold values could be determined based on the number of correct characters obtained when writing a text, message, etc., considered typical for the application of the keyboard.

According to a more preferable embodiment of the invention, the parameter values L1, L2 and L3 can be adjusted automatically depending on the values of the parameters corresponding to N2 preceding characters. If for instance the writing speed of the operator increases, the corresponding two depression distributions shown in FIG. 3 will be shifted towards zero, and a duration initially judged by the system to be a "long" duration will gradually move into the "short" duration interval covered by the "short" duration distribution in FIG. 3, leading to the erroneous conclusion that a larger and larger proportion of depressions belongs to the "short" category. In order to avoid this error it is of vital importance that the specific parameter values L1, L2 and L3 should automatically be adjusted by the system during actual operation. This can for instance be accomplished by measuring the actual duration of each depression and storing it in a data memory, subdividing these data into the two categories "short" and "long", computing the running average over N2 preceding characters and finally adjusting the actual parameter values based on these two computer running averages.

According to still another embodiment of the invention said either manually or automatically adjusted parameters L1, L2 and L3 can be assigned different values corresponding to each of the character keys. This assignment can either be based on predetermined ratio between typical differences of durations of depressions corresponding to each character, or can be implemented automatically along the same lines as outlined in the previous section.

The adjustment of the parameters L1, L2 and L3 for a specific character may depend on either the values of the determining parameter for that specific key, or be calculated on the basis of the determining parameters for all keys.

The above automatic procedure for adjusting the parameter values L1, L2 and L3 may lead to erroneous results for the following reason: Suppose that a certain number of durations Ns, where 0<=Ns<N2, have been measured and stored as mentioned above and the work hereafter for some reason is interrupted for a longer period of time T (see FIG. 4) much in excess of the parameter values L1, L2 and L3, the remaining N2-Ns parameter values may on average have changed compared to the Ns first parameter values of the sample of N2 values. This interruption will then influence the determined running average of durations and at least in an initial period of time after the interruption lead to an increased number of false judgements between "short" and "long" duration of depressions. Thus, a mechanism should be introduced in the system to the effect that the Ns parameter values preceding the interruption of length T have reduced or no effect on the formation of the running average of parameter lengths after the interruption.

Due to the fact that different users will type at different speeds and with different distinctions between "short" and "long" the durations, it is advantageous that the system is capable of storing different (initial) parameter values for each user, and the choice between the user-specific parameter sets could for instance be accomplished using an initial user-code to be keyed in during start up of the system by a specific user (the user-code could for instance consist of a password providing general access to the system).

Other automatic procedures for choice between depressions of "short" and "long" duration may comprise a procedure according to which the values of L1, L2 and L3 depend on the weighted average of a certain number N3 of preceding parameter values below L1 in combination with the average of a certain number N4 of preceding parameter values above L1, with a specific weight being assigned to each key. Also the choice could depend on the weighted range of distribution of a certain number N3 of preceding parameter values below L1 in combination with the range of distribution of a certain number N4 of preceding parameter values above L1, with a specific weight being assigned to each key. Finally, instead of considering the whole distribution ranges of parameter values, two smaller ranges C1 and C2 (see FIG. 3) of parameter values may be utilized, where C1 and C2 are the parameter ranges located closest below L1 and closest above L1, respectively.

The various above embodiments of the invention, and specifically the said procedures of automatic distinction between "short" and "long" duration of the depression of a specific key are to be considered as specific examples of embodiments of the invention. It will be possible for a person skilled in the art to devise other embodiments of the invention without departing from the general idea of the invention as set forth in the appended claims.

What is claimed is:

1. A keyboard for one-handed touch typing including an arrangement of keys, each of the keys corresponding to two characters, the characters corresponding to either the right or left side of a row of keys on a Sholes keyboard mirrored upon each other, a determining parameter means for alternatively activating each of the two characters of each key, the determining parameter corresponding to the length of time of depression of the key such that if the length of time of depression is below a first threshold value a first character is chosen, if the length of time of depression is above a second threshold value a second character is chosen, and if the time of depression is between the first and second threshold values the character chosen is dependent upon the likelihood of which of the first and second characters is correct, based upon which alphanumeric characters were previously chosen.

2. The keyboard according to claim 1, wherein the determining parameter is such that a comparatively "short" depression of the key corresponds to first of the two alternative characters of that particular key and a comparatively "long" depression of the key corresponds to the second of the two alternative characters of that particular key.

3. The keyboard according to claim 1, further comprising means enabling the user of the keyboard to manually adjust the threshold values either one at a time or simultaneously through some predefined relationship between them and a parameter which can be adjusted manually by the user.

4. The keyboard according to claim 1, further comprising means to adjust the threshold values automatically depending on the values of the determining parameter(s) for a number of preceding characters.

5. The keyboard according to claim 4, further comprising means to adjust the threshold values for each of the different character keys of the keyboard.

6. The keyboard according to claim 4, wherein the means to effect the automatic adjustment of the threshold values has reduced or no dependency on the values of the determining parameter(s) for preceding characters typed before an interruption of a certain length, even though these characters are also among said preceding characters.

7. The keyboard according to claim 4, further comprising means to store different threshold values for different users, so that user-specific threshold values can be adjusted manually or automatically.

8. The keyboard according to claim 4, wherein the means to effect the adjustment of the threshold values depends on the weighted average of a certain number of preceding determining parameters with values below a first threshold value in combination with the average of a certain number of preceding parameters with values above the first threshold value with a specific weight being assigned to each key.

9. The keyboard according to claim 4, wherein the means to effect that adjustment of the threshold values depends on a weighted range of distribution of a certain number of preceding parameters with values below a first threshold value in combination with the range of distribution of a certain number of preceding parameters with values above the first threshold value, with a specific weight being assigned to each key.

10. The keyboard according to claim 4, wherein the means to effect the adjustment of the threshold values depends on the weighted values of a smaller number of determining parameters, said determining parameters being characterized by being those closest below a first threshold value, together with a smaller number of determining parameters, which are characterized by being those closest above the first threshold value, and where a specific weight is assigned to each key.

11. The keyboard according to claim 1, further comprising means to disable the first and second threshold values, so that the choice between alternative characters depends only on whether said determining parameter is above or below a single threshold value.

* * * * *